United States Patent
Hofhus et al.

(10) Patent No.: US 10,266,363 B2
(45) Date of Patent: Apr. 23, 2019

(54) MICRODUCT-TUBE WINDER, DOUBLE STATION WINDER, PROCESSING SYSTEM FOR EMPTY PLASTICS MICRODUCT TUBES AND METHOD FOR WINDING UP SUCH TUBES

(71) Applicants: KRAUSSMAFFEI TECHNOLOGIES GMBH, München (DE); GRAEWE GMBH, Neuenburg (DE)

(72) Inventors: Michael Hofhus, München (DE); Martin Rüdiger, München (DE); Michael Graewe, Schliengen/Liel (DE); Dominik Prechsl, München (DE); Stefan Graewe, Badenweiler (DE)

(73) Assignees: KRAUSSMAFFEI TECHNOLOGIES GMBH, München (DE); GRAEWE GMBH, Neuenburg (DE)

( * ) Notice: Subject to any disclaimer, the term of this patent is extended or adjusted under 35 U.S.C. 154(b) by 286 days.

(21) Appl. No.: 14/911,762

(22) PCT Filed: Aug. 20, 2014

(86) PCT No.: PCT/EP2014/067732
§ 371 (c)(1),
(2) Date: Feb. 12, 2016

(87) PCT Pub. No.: WO2015/024962
PCT Pub. Date: Feb. 26, 2015

(65) Prior Publication Data
US 2016/0185027 A1   Jun. 30, 2016

(30) Foreign Application Priority Data
Aug. 21, 2013 (DE) .................. 10 2013 109 056

(51) Int. Cl.
*B65H 54/22* (2006.01)
*B65H 54/20* (2006.01)
(Continued)

(52) U.S. Cl.
CPC ......... *B65H 54/22* (2013.01); *B29C 47/0898* (2013.01); *B65H 54/20* (2013.01);
(Continued)

(58) Field of Classification Search
CPC .................................................. B65H 54/22
See application file for complete search history.

(56) References Cited

U.S. PATENT DOCUMENTS

| | | | |
|---|---|---|---|
| 4,541,584 A * | 9/1985 | Rivinius | ................ B65H 54/28 |
| | | | 242/157.1 |
| 4,605,178 A | 8/1986 | Bartzick et al. | |

(Continued)

FOREIGN PATENT DOCUMENTS

| | | |
|---|---|---|
| CN | 101804927 A | 8/2010 |
| DE | 41 27 319 A1 | 2/1993 |

(Continued)

OTHER PUBLICATIONS

English Abstract for DE 4127319 (Year: 1993).*
(Continued)

*Primary Examiner* — Timothy Kennedy
(74) *Attorney, Agent, or Firm* — Henry M. Feiereisen LLC

(57) ABSTRACT

The invention relates to a microduct-tube winder (5) for winding up extruded empty plastics microduct tubes having an outside diameter of about 2 to about 20 mm, having a reel (8) which is rotatable about a rotation axis (16) and has a core (9) arranged between two radially projecting flanges (10), the tube being windable on said core (9), and having a tube guiding device (6), via which the tube is fed to the reel (Continued)

(8), wherein a first transfer point is provided on the tube guiding device (6), the tube losing contact with the tube guiding device (6) at said first transfer point in the operating state of the microduct-tube winder (5), and wherein provision is made of a second transfer point, assigned to the reel, the tube coming into contact with the core (9) or a tube layer wound onto the latter at said second transfer point, wherein the tube guiding device (6); is movable in a transverse plane of the reel (8) and the reel (8) is movable in the direction of its rotation axis (16) such that in the operating state the winding angle (a) at the second transfer point always remains the same. The invention also relates to a double station winder (1) having two such microduct-tube winders (5), to a processing system having a microduct-tube winder (5), to a manufacturing system having an extrusion apparatus and a processing system and to a method for winding up an empty plastics tube.

10 Claims, 20 Drawing Sheets

(51) Int. Cl.
| | | |
|---|---|---|
| *B65H 54/28* | (2006.01) | |
| *B65H 54/72* | (2006.01) | |
| *B65H 54/74* | (2006.01) | |
| *B29C 47/08* | (2006.01) | |
| *B29L 23/00* | (2006.01) | |

(52) U.S. Cl.
CPC ......... *B65H 54/2803* (2013.01); *B65H 54/72* (2013.01); *B65H 54/74* (2013.01); *B29L 2023/005* (2013.01); *B65H 2701/331* (2013.01)

(56) References Cited

U.S. PATENT DOCUMENTS

| | | | | |
|---|---|---|---|---|
| 4,784,341 A | * | 11/1988 | Hill | B65H 67/056 242/474.9 |
| 4,979,687 A | * | 12/1990 | Birch | B65H 54/34 242/474.4 |
| 2009/0049669 A1 | * | 2/2009 | Lennemann | B65H 54/70 28/281 |
| 2010/0288868 A1 | | 11/2010 | Rutledge, Sr. | |

FOREIGN PATENT DOCUMENTS

| | | |
|---|---|---|
| DE | 43 40 360 A1 | 6/1995 |
| DE | 296 12 732 U1 | 2/1997 |
| DE | 196 14 404 C1 | 10/1997 |
| DE | 20 2005 004 817 U1 | 9/2005 |
| EP | 0 139 088 81 | 5/1985 |
| WO | WO 2012/146293 A1 | 11/2012 |
| WO | WO 2014/121812 A2 | 8/2014 |

OTHER PUBLICATIONS

International Search Report issued by the European Patent Office in International Application PCT/EP2014/067732.
English Chinese Search Report issued in Chinese patent application No. 201480045219.1 dated Apr. 17, 2018.

* cited by examiner

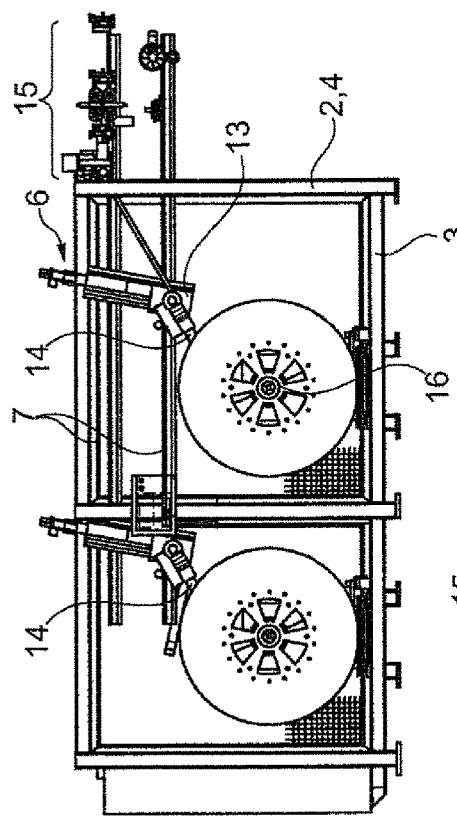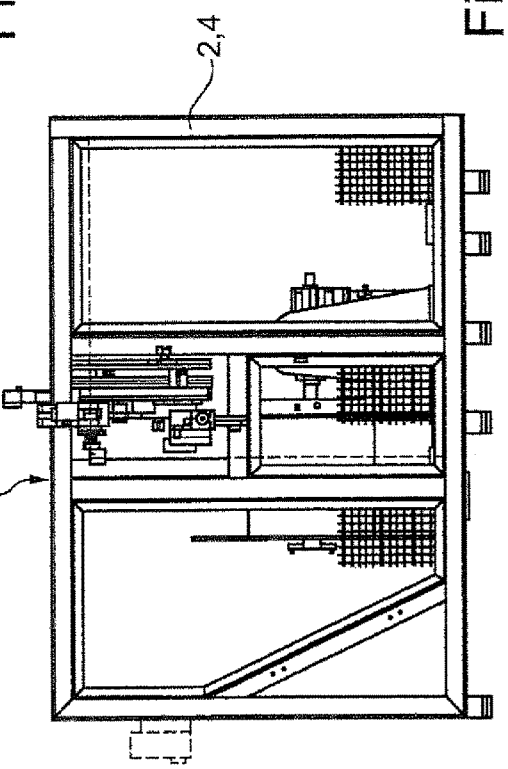

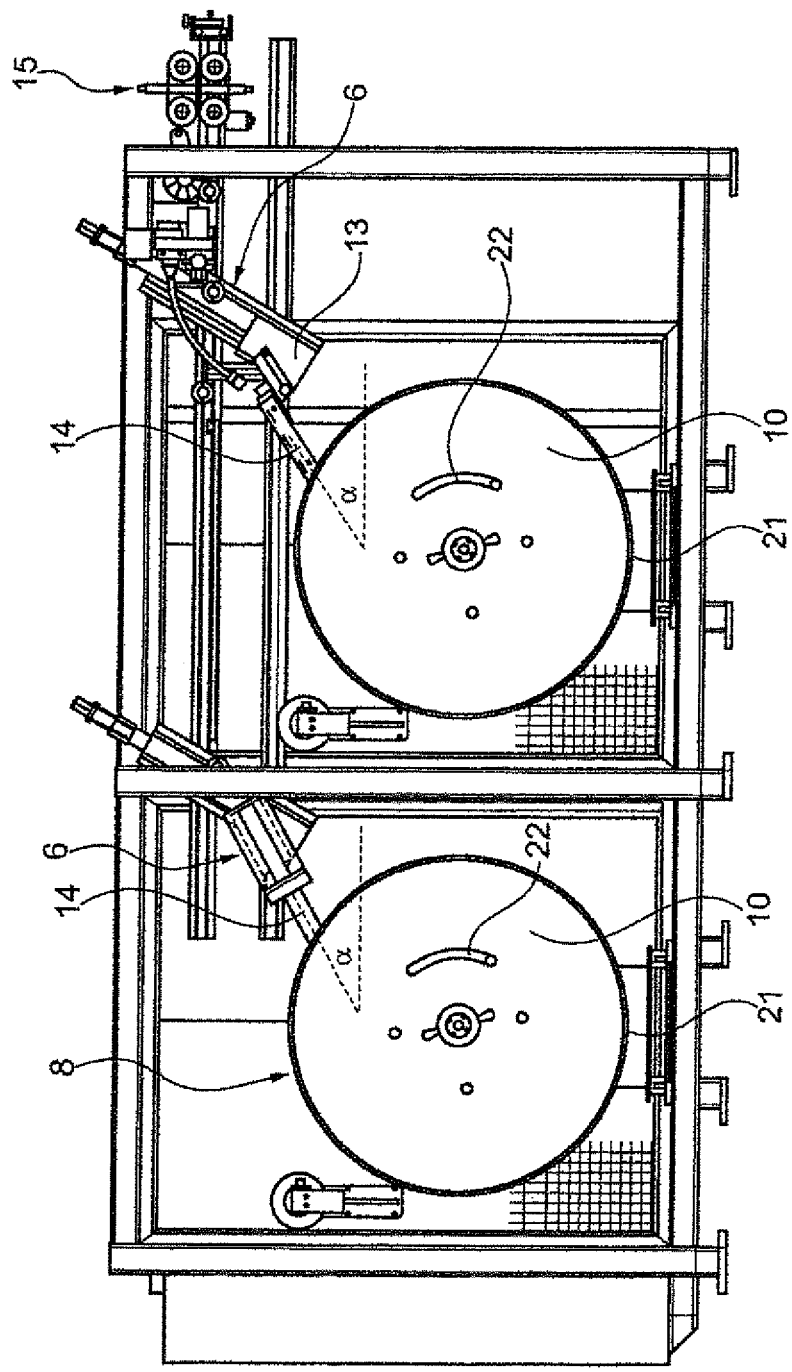

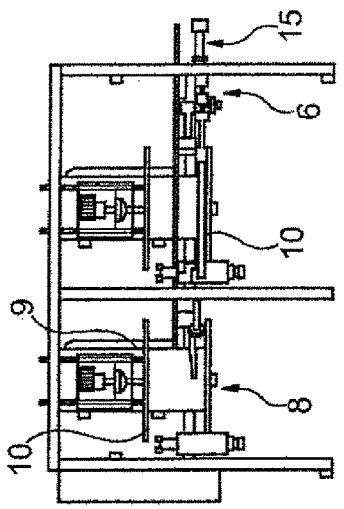
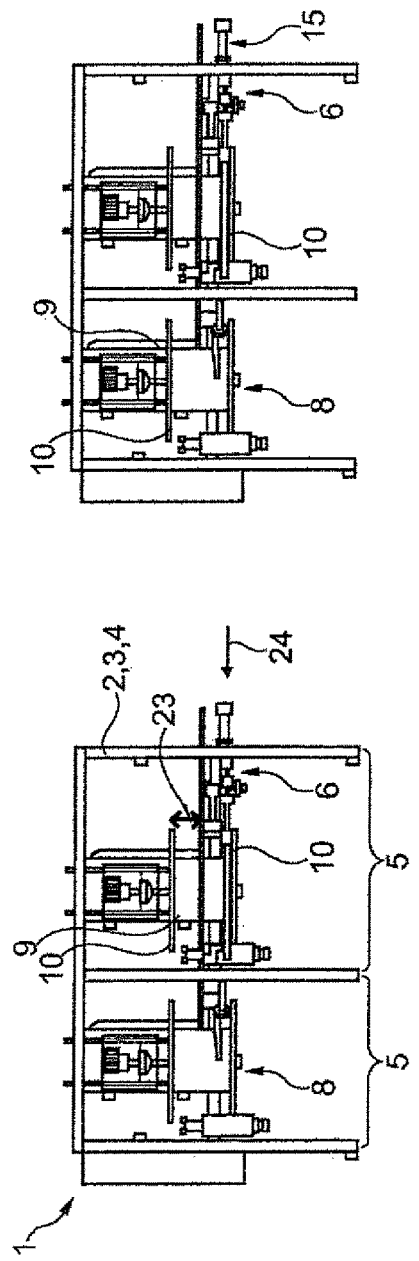
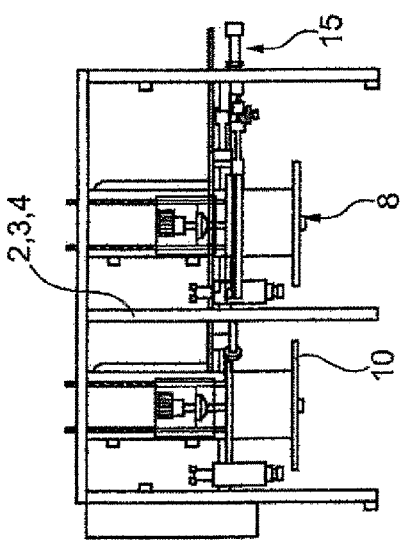

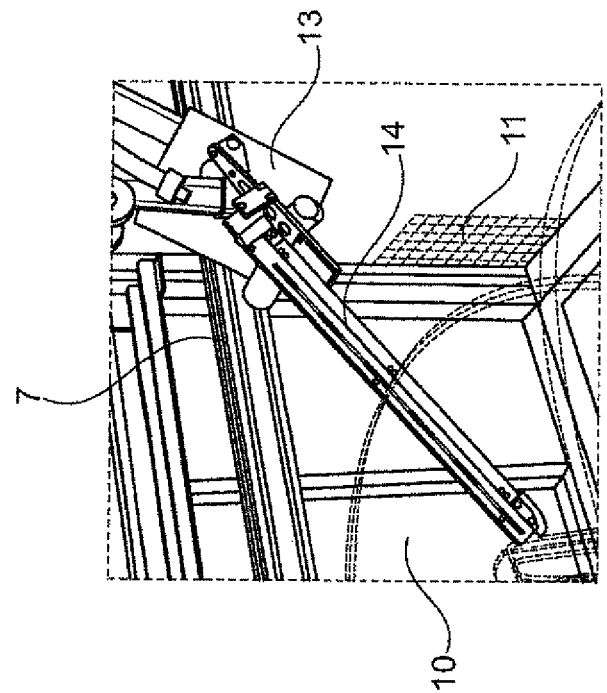
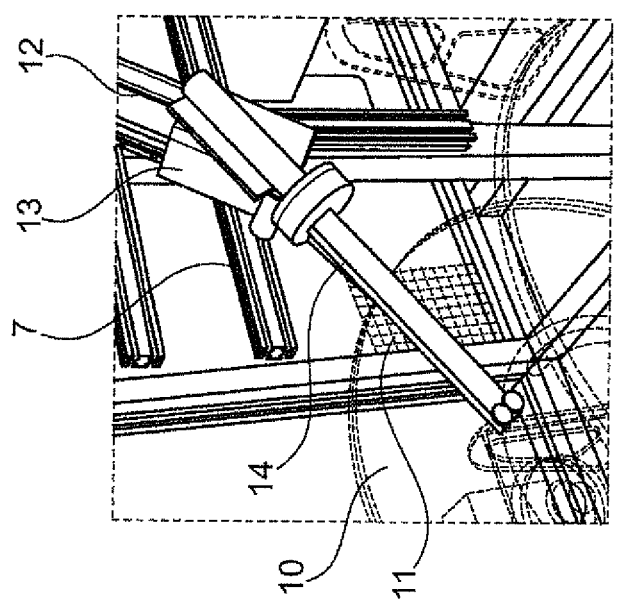

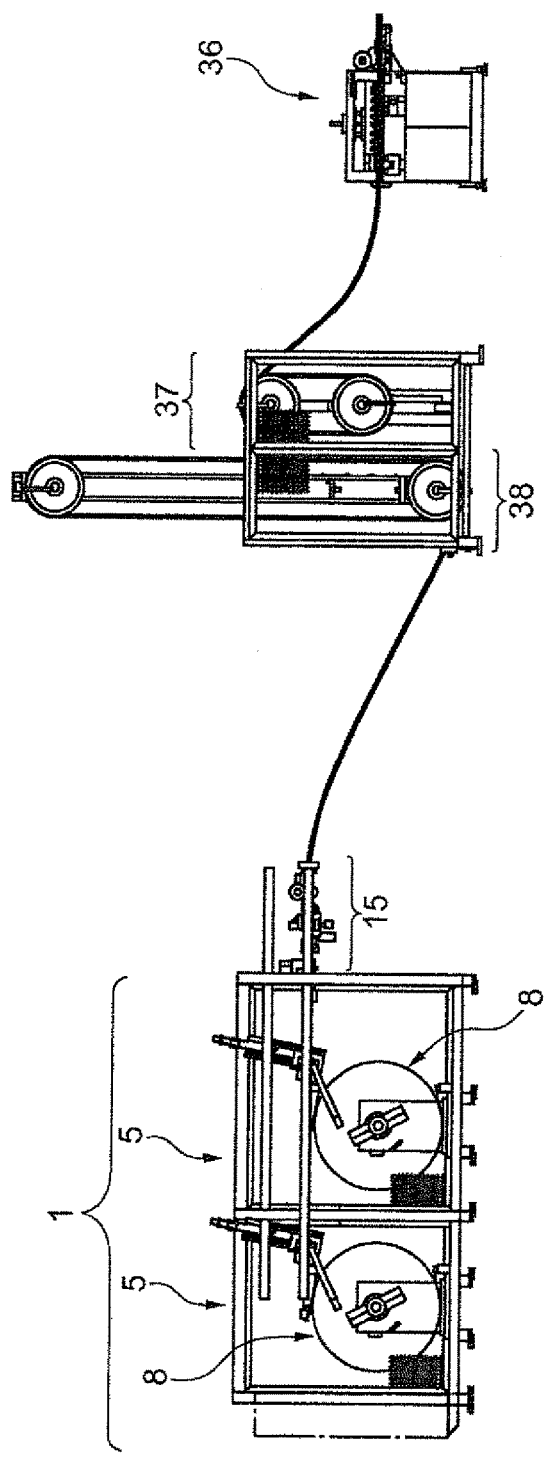
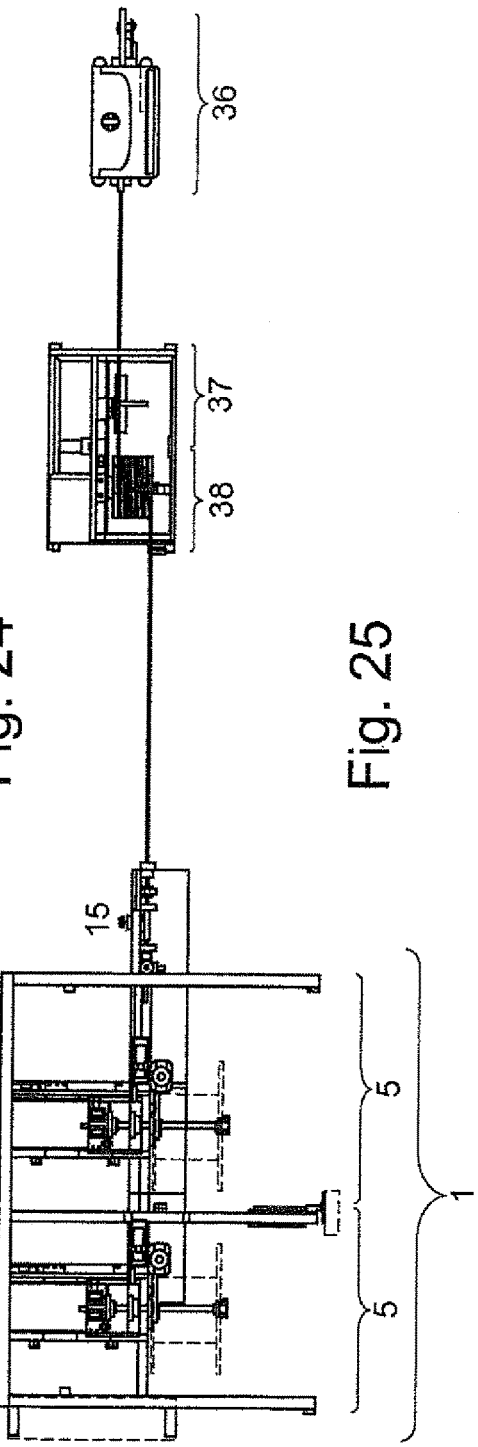
Fig. 24
Fig. 25

MICRODUCT-TUBE WINDER, DOUBLE STATION WINDER, PROCESSING SYSTEM FOR EMPTY PLASTICS MICRODUCT TUBES AND METHOD FOR WINDING UP SUCH TUBES

CROSS-REFERENCES TO RELATED APPLICATIONS

This application is the U.S. National Stage of International Application No. PCT/EP2014/067732, filed Aug. 20, 2014, which designated the United States and has been published as International Publication No. WO 2015/024962 and which claims the priority of German Patent Application, Serial No. 10 2013 109 056.7, filed Aug. 21, 2013, pursuant to 35 U.S.C. 119(a)-(d).

BACKGROUND OF THE INVENTION

The invention relates to a microduct-tube winders for winding up extruded empty plastics microduct tubes having an outside diameter of about 2 to about 20 mm, having a reel which is rotatable about a rotation axis and has a core arranged between two radially projecting flanges, the tube being preferably windable on said core in several layers, and having a movable tube guiding device preferably upstream of the reel, via which the tube is fed to the reel, wherein a first transfer point is provided on the tube guiding device, the tube losing contact with the tube guiding device at said first transfer point in the operating state of the microduct-tube winder, and wherein provision is made of a second transfer point, assigned to the reel, the tube coming into contact with the core or a tube layer wound onto the latter at said second transfer point. Microduct-tube winders can also be designated as winding units, by means of which empty plastics microduct tubes are able to be wound on reels.

Devices are already known from the prior art for the producing and storing of windable plastic tubes, for instance from DE 296 12 732 U1. There, a system with a continuously operating extrusion device for the production of plastic tubes is disclosed, which is provided with a downstream winding device for the produced plastic tubes. Here, between the extrusion device and the winding device, an intermediate storage device is used for the intermediate storage of the continuously extruded plastic tube when the winding device is stopped.

In the processing of metal cord, which is formed from a plurality of single wires, the use of single twist cable-making machines is also known. Thus, for example, DE 196 14 404 C1 discloses a single twist cable-making machine with an open stranding rotor in which, on both sides of a reel, plates are placed on corresponding openings of reel walls and a means transferring at least tensile forces acts on the plate lying further distant from the drive of the reel.

Close prior art is also known from DE 43 40 360 A1, in which a method and a device is disclosed for the intermediate storage of strand-shaped material.

Methods and devices for the compensatory storage of packaging tape in packaging machines is also known from EP 0 139 088 B1. However, it is located in a different technical field, namely that of packaging tapes.

DE 20 2005 004 817 U1 also is not concerned with empty plastics tubes, even less with empty plastics microduct tubes, but rather with threads, in the context of which a dancer control is disclosed. Here, a double spindle winder is used for the continuous winding of threads, which enables a thread change from a first spindle to a second spindle in continuous operation, wherein the thread is fed to one of the spindles by means of a laying device, wherein in addition the two spindles are arranged adjacent to one another with offset spindle axes aligned in a parallel manner, and the thread is fed to the laying unit via a thread tension control.

The invention also concerns double station winders with two microduct winders, wherein fully automatic double winders are already used in other fields of application in high-performance extrusion systems with high extrusion speeds.

Frequently, three-phase motors are used for the drive, which are dancer-controlled or are regulated via tensile force. The laying is possibly synchronized with the rotation speed of the winder drive and can be adjusted continuously. A strapping of created coiled bundles with bands is known hitherto, likewise the wrapping of the coiled bundles in foils. Here, now and again, combination winders are used, or those which are suitable for the radial wrapping of the bundles in foil. The use of automatic winders for packing the coiled bundles directly into cardboard boxes is likewise known.

Microduct-tube winders with securely fixed winding stations and a displaceable, movable laying arm are usual. The laying arm then moves transversely to the feed direction of the microduct tubes. Unfortunately, a large amount of play occurs here and results in inaccuracies which entail a poor laying pattern. In extreme cases, even a winding interruption can occur. Hitherto, only very short coil lengths are possible, until an error occurs. In order to prevent these problems, manual laying is frequently resorted to, which, however, is not CE compliant. Also, here, only speeds up to 50 m per minute are possible, which therefore has a highly efficiency-inhibiting effect.

Despite everything, the winding result is hitherto if anything defective because flaws or cross-overs of the tube are still possible. "Flaws" are understood here to mean that the tube does not adjoin seamlessly in transverse direction onto a previously laid tube section and thus a gap occurs.

A "cross-over" is understood as a crossing of two tube sections. Such a cross-over can entail a kink in the tube. The passage through the empty space of the plastics tube is then no longer possible or no longer possible in an uninhibited manner. Electric lead elements such as glass fibres can then no longer be introduced, for instance blown in, into the empty plastics tube. The "blow-in lengths" in this regard are thereby greatly reduced.

Small tube diameters of approximately 3 or 4 to approximately 10 mm can at present not be wound automatically at all, without resorting to a manual intervention. However, this then results in an increased safety risk for the operating personnel.

The problems, as presented above, also further intensify through the use of low-cost reels, which are mostly constructed based on wood or plastics or respectively now and again based on metal, such as steel. The dimensional accuracy of such reels is hitherto poor, bearing in mind the desired cost reduction. With the use of existing winding units, the problems identified above then occur in an increased manner.

Attempts were made to use upstream magazines, for example of the pneumatic type of actuation, whereby the coil change times are to be bridged. "Coil change times" is understood to mean the time which is required for changing a reel fully occupied with tubes up to the end of the inserting of a new, tube-free reel. However, such magazines frequently have the disadvantage that a winder or a downstream belt-type haul-off draws the tube through the magazine and therefore the tube undergoes an elongation, which is undesired, because this is detrimental to the precision of the tube.

Even in the case of changes to existing winders, in the case of very small microduct tubes at high speeds, no satisfactory results could be achieved. Very small microduct tubes are those tubes which have a tube outside diameter of ≤2 mm, 3 mm, 4 mm, 5 mm, 6 mm, 7 mm, 8 mm, 10 mm, 12 mm, 14 mm, 16 mm, 18 mm or 20 mm. Intermediate sizes are, of course, also included here. Such empty plastics microduct tubes have here a wall thickness of approximately 0.6 mm to 2 mm. This wall thickness is composed of the material thickness due to the plastics material and of a ribbing or silicone coating, present on the inner side, of approximately 0.15 mm. The ratio of weight to meter in kilograms per meter is between 0.0145 to 0.1115. Usual outputs are 104 kg per hour to 421 kg per hour. The withdrawal speeds vary between 63 m per minute, 80 m per minute, 108 m per minute and 120 m per minute.

"High speeds" are understood to mean speeds of 100 to 125 m per minute and beyond, for instance in the region of ≥200 m per minute.

SUMMARY OF THE INVENTION

It is the object of the present invention to remedy the disadvantages from the prior art and to be able to wind empty plastics microduct tubes without cross-over. Also, a length extension by tensile stress during the winding process is to be prevented, ovality is to be excluded and kinks, for instance through cross-overs, are to be prevented. The winding precision is to be increased. Nevertheless, the use of reasonably priced wood drums is to continue to be possible and tolerance fluctuations due to moisture, manufacturing inaccuracies are to have no influence on the winding pattern. Also, the threading of the tube is to have no negative effects on the winding pattern, in particular as the lowermost layer is crucial for the layers following thereabove. The "blow-in length", i.e. the length on which glass fibres can be subsequently introduced into the empty plastics microduct tubes, is to be as large as possible. The bundling of several empty plastics microduct tubes within a tube bundle is still to be possible.

This problem is solved according to the invention in a generic microduct-tube winder in that the tube guiding device is movable in a transverse plane of the reel, i.e. in a plane perpendicular to the rotation axis of the reel and, as far as possible coordinated therewith, the reel is movable in the direction of its rotation axis such that in the operating state the winding angle, i.e. the angle present in the three-dimensional space between the tube on the reel side and the tube on the tube guiding device side, or respectively the tube section on the reel side and the tube section on the tube guiding device side, at the second transfer point always remains the same.

A clean laying pattern is then the result and a precise laying without cross-over of the empty plastics microduct tube with a predetermined winding length and maximum speed is guaranteed.

Advantageous embodiments are claimed in the subclaims and are explained below.

Thus, it is advantageous if the reel is mounted for the simultaneous carrying out of the rotation about its rotation axis and transverse moving in rotation direction, i.e. transversely to the feed direction of the tube. Whilst therefore the tube is wound owing to the rotation of the reel, the tube is wound free of play via the transverse moving of the reel and the fixed tube guiding device in transverse direction. A good laying pattern is the result.

In other words, it is therefore desired that the tube guiding device is mounted so that it is movable with respect to the second transfer point in the operating state only in the transverse plane. Thereby, the precision is increased.

It is also advantageous if the winding speed, the tube outside diameter and the movement speed of the tube guiding device are coordinated with one another so that in the operating state the distance between the first transfer point and the second transfer point always remains the same. A moving away of the second transfer point with a filling reel is then the result and is desired, because the conditions between the first and the second transfer point then do not alter and the tube guiding device then does not have a braking or impeding effect on the winding process, in particular not starting from a particular position. The result is an optimum trade-off.

It is also expedient if the winding speed due to the rotation speed of the reel and the feed speed of the tube are coordinated with one another so that the tube at the second transition point is/is being transferred to the reel substantially/almost or completely free of tensile stress. Ovalities occurring in the tube are ruled out, just as extensions and undesired tension increases onto the individual layers of the wound tube in the region of the reel are ruled out or are at least considerably reduced.

The guidance is also improved when the tube guiding device has a main body on which an arm-like blade is applied, wherein the tube is guided along the blade.

It is advantageous here if at the distal end of the blade, facing the reel, two rollers are arranged in the first transfer point or respectively directly adjacent, between which the tube is guided through. A jumping of the tube off from the blade is then effectively ruled out.

In order to be able to regulate or control the distance as precisely as possible, it is advantageous if a distance sensor is arranged on the blade, preferably at the distal end, which is designed for determining the distance between the blade and the reel, for instance the flange, the core and/or a tube layer present at least partially on the core.

It has been found to be efficient if the distance sensor is designed as a mechanical sensor or as a sensor operating in a contactless manner, for instance as a capacitive, inductive or light-sensitive sensor, for example with the use of a camera.

In order to guarantee a certain movability of the tube guiding device or parts thereof, it is expedient if the main body is connected to a guide rail for moving. When the guide rail is aligned parallel to a radial connection line connecting the rotation axis with the second transfer point, or is positioned thereto, for instance is positioned in the direction away from the reel, similar relationships will always be to be reverted to. Thereby, the reproducibility of the winding result is improved over the winding process.

It is advantageous if the blade is connected pivotably about its longitudinal axis on the main body. In this way, the tube can always be brought as close as possible to the flange, without the blade determining or respectively impeding here with regard to the distance. A maximum utilization of the reel width situated between the flanges by what is to be wound is then the result.

It has also been found to be advantageous if at the distal end of the blade a supporting element such as a supporting wedge is arranged, in order to come in contact with the tube layer on the core or a tube layer deposited on the core. A sliding contact is then possible but is not necessary/desired in all cases of application.

It is also advantageous if a cutting device in the manner of a guillotine is associated with the tube guiding device. Such a guillotine can be actuated by a control device according to need, for example as a function of the already wound tube. It is possible that in the hook-on state upstream of the operating state the blade is being/is pivoted actively from the transverse plane in the direction of the flange. A portion of the tube can then be guided through an opening, such as a hole, in the flange of the reel and can be held here in a form-fitting manner. After the hook-on state, the blade travels back again into its position not left in the operating state, therefore remains in the transverse plane in which the two operating points, i.e. the first and the second operating point, lie.

Play is minimized when the blade is embodied as a short, solid metal part, for instance as a steel component.

It has also been found to be advantageous when the core is provided with a coating, for instance with a material acting in a friction-increasing manner in the rotation axis direction and/or compressible orthogonally thereto, in particular in radial direction, such as foam rubber.

The invention also relates to a processing system for empty plastics microduct tubes produced by an extrusion device, with a microduct-tube winder of the type according to the invention and with an upstream magazine and a belt type haul-off upstream thereof.

It is possible here that in the processing system also a double station winder is used, which uses two microduct-tube winders of the type according to the invention. This double station winder can have a shared frame, such as a stand, for instance a tubular stand.

It is also advantageous if between the belt-type haul-off and the magazine a preferably electric dancer control is arranged.

Further advantageous embodiments of a processing system according to the invention are outlined as follows.

It is thus advantageous if the magazine has two reels which are movable electrically, pneumatically and/or hydraulically to one another, which are at least partially wound around by the tube. In this way, a change time of approximately 20 seconds can be guaranteed, but also greater change times can be realized. Buffer times of at least 60 seconds are then able to be realized.

If a relief haul-off and/or an additional conveying device able to be actuated selectively on changing of the reel is present between the magazine and the microduct-tube winder, then the changing of the reel can be configured more comfortably and at the same time less time can elapse unutilized.

The invention also relates to a manufacturing system having an extrusion apparatus and a processing system according to the invention.

Finally, the invention also relates to a method for winding an empty plastics microduct tube having an outside diameter of approximately 2 mm to approximately 20 mm on a core of a reel, arranged between two flanges, wherein the tube is transferred by a tube guiding device to a first transfer point to the reel to a second transfer point and the tube guiding devices in the operating state, for instance when the transferring of the tube to the reel takes place with a subsequent winding there, is moved only in a transverse plane of the reel rotating about a rotation axis, wherein the reel is moved here continuously or stepwise in the direction of the rotation axis such that the winding angle always remains substantially the same.

It is advantageous here if before the depositing of the tube the tube guiding device travels during a teach-in process from one flange, sensing this, to the other flange, sensing this. In this way, a change in the quality and dimensioning of different reels can be accommodated and an otherwise possibly necessary regulating process can be dispensed with.

When a blade of the tube guiding device scans the core (here), for instance in a contactless manner or mechanically, the information necessary for the further method can be made available to the control device. The data collected during scanning are used further expediently in the further method sequence.

It is thus advantageous if in the operating state, after the detecting of the immediate presence of one of the two flanges or an end of the core, the linear movement direction of the reel along its rotation axis is reversed. This therefore forces a change of direction of the linear movement of the reel, with continuous rotation of the reel.

The linear movement direction is advantageously also reversed immediately after the detection or after such a time span which is required that the reel rotates through 180°. An optimum utilization of space is then the result.

When several layers on tube sections/tubes, for example 30 or more layers, are wound onto the core, a sufficiently long tube configuration can be taken to the laying site.

It is also advantageous if a laser identification, projected onto the layers, which projects a line onto the uppermost tube sections of one or more layers formed by the tube, and the laser identification is detected via an image recognition system and the detected data are fed to an evaluation unit, which determines the winding quality.

The above aspects are able to be combined and exchanged with one another.

The warmer the tube becomes, the more critical the processing is, because on cooling or respectively during a cooling process, a shrinking also occurs and any cross-overs/crossings then have an extremely critical effect. The tolerances of the diameters of the monotubes are compensated in the invention, just as a variability in speed no longer has any great consequences.

In other words, tube speeds into the region of 200 m per minute become possible. Tube diameter ranges of 3 to 14 mm, possibly even greater, are able to be processed. Full- or semi-automatic double station winders can be generated. Only small tolerances occur in the overall system. In order to give the operator sufficient time for the coil change, for instance storage capacity of at least 1 minute able to be made available, the use of electric magazines with dancer control before a double station winder is advantageous. Also a belt-type haul-off with a sufficient contact length of 800 to 1000 mm and adapted withdrawal force is advantageous.

The invention can be further developed by the use of traversing reels with precision adjustment devices, for instance ball spindles/ball screws, which have little play, with a strengthened/rigid laying guide, wherein the winding site is moved and not the laying arm. This laying arm is rigid in a corresponding embodiment. It is advantageous if the mounting of the winding shaft is reinforced, for instance with the use of a thicker axis.

As an extension, a manual hooking-on can be replaced by an automatic hooking-on, whereby no disturbance is brought into the system at the start. Threading aids can be used via two driven rollers at the inlet of the winder, whereby an automatic pushing through to the second winding site is achieved. The laying itself is fixed for both winding sites. The tube guide can be provided optionally with a for instance mechanical supporting wedge or with a contactless laying, for instance an ultrasonic sensor. The contactless laying can have recourse to pivoting guide rollers. A positioning control is likewise desirable, as is a synchronized laying.

A laying with a vertical axis, i.e. creation of the layers on drawing back of the blade during the laying with or without flange scanning is also possible.

Different reels can be used, wherein the reel width can vary from 400 mm to 800 mm. The reel diameter can vary from 800 mm to 1200 mm. A receiving bore in the core region, which penetrates the flanges and the core of the reel, can be 40, 50 or 60 mm. The core diameter itself can measure 600 mm to 800 mm on its outer side. The total drum weight can be approximately 300 kg.

A holding angle for the front and rear side of the reel can be entered separately. The holding angle can be variable over the drum diameter. In order to validate the dimensions of the reel in the control, a "teach-in" process of the respective reel dimension can take place via a flange scanning. A scanning of the reel quality on inserting of the reel, with subsequent notification when the reel does not meet the requirements, can act so as to eliminate errors. Different materials present themselves as core coating, such as e.g. with foam rubber.

The quality of the reel with respect to the manufacturing accuracy, in particular in so far as single- or multiple use, humidity etc., are concerned, has a considerable influence on the winding pattern.

The control can be provided with a jog button for corrections, in order to ensure possibilities for manual intervention possibilities by the operating personnel. The positioning takes place in the winding-on position. A "teach-in" can also take place for the reversal points (i.e. at a change of direction of the transverse movement of the reel). Longitudinally introduced tensile stresses, which are to be avoided in monotubes/empty plastics microduct tubes, are kept efficiently low. In particular, the processing of polyethylene/HDPE tubes becomes possible.

An increase in the productivity of each microduct-monotube line is able to be achieved. Speeds up to 200 m per minute are able to be realized. A clean laying pattern, without cross-over and therefore without kink formation, is the result. The increase in operator convenience through several automation stages is likewise able to be implemented. In this way, high-efficiency complete lines for the production of microduct lines from one source can be made available.

BRIEF DESCRIPTION OF THE DRAWING

The invention is explained in further detail below with the aid of a drawing. There are shown:

FIG. 3 a view from the side, from which the tube is fed, onto the double station winder of FIGS. 1 and 2

DETAILED DESCRIPTION OF PREFERRED EMBODIMENTS

The figures are merely diagrammatic in nature and serve merely for the understanding of the invention. Identical elements are provided with the same reference numbers. It is possible that components according to the invention are omitted or exchanged. Also, features of particular example embodiments are transferable to other example embodiments.

Figure 1:
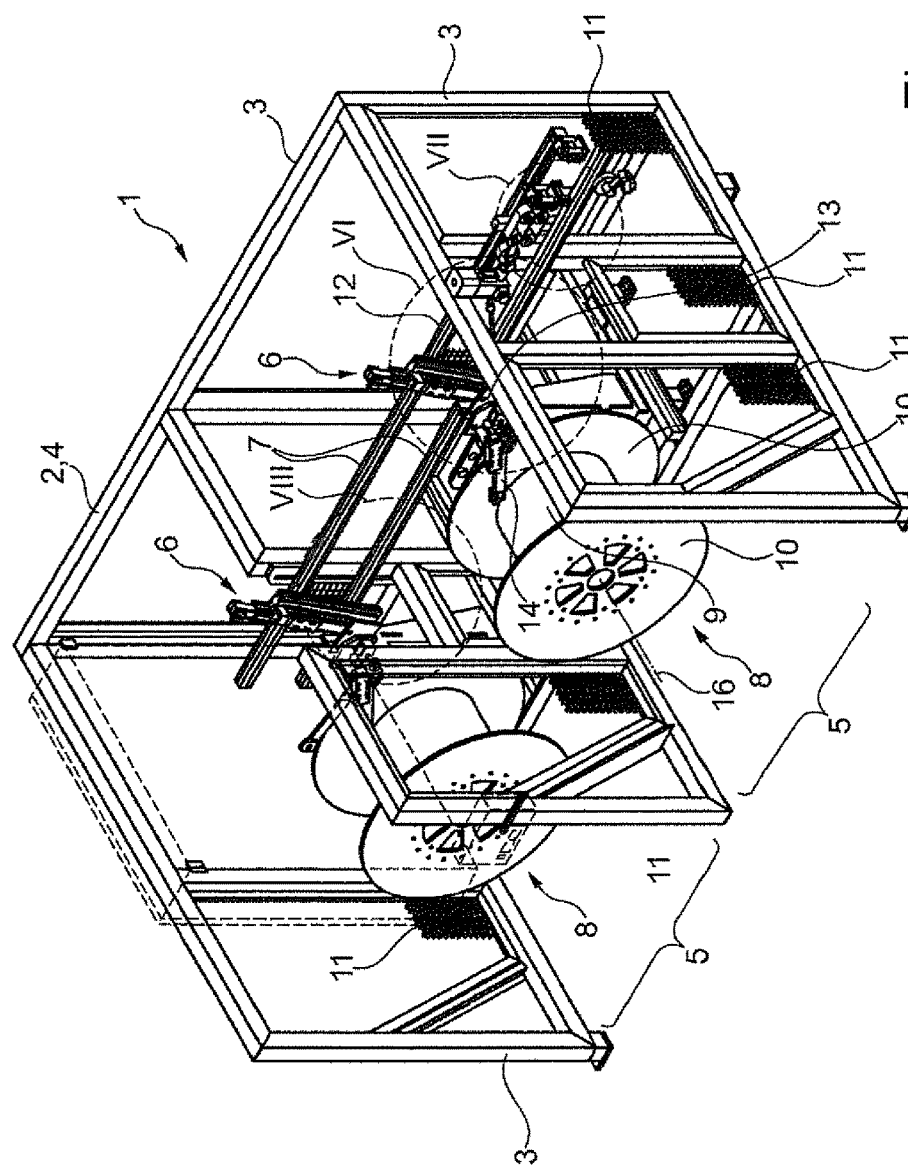
FIG. 1 a double station winder according to the invention with two microduct-tube winders in a perspective illustration, wherein a tube guiding device is indeed illustrated for each reel of the microduct-tube winder, but not the tube which is laid or respectively is to be laid, FIG. 2 a view from the front onto the double station winder of FIG. 1

In FIG. 1, a double station winder 1 according to the invention is illustrated. The double station winder 1 has a frame 2. The frame 2 combines individual support tubes/tubes 3 to form a stand 4. The support tubes/tubes 3 can be configured as round or angular hollow tubes.

Two microduct-tube winders 5 are present within the stand 4. Each microduct-tube winder 5 has a tube guiding device 6. The tube guiding device 6 here is mounted movably on two guide rails 7. The tube guiding device 6 guides an empty plastics microduct tube, which is not illustrated, to a reel 8, wherein the reel 8 has a core 9 between two flanges 10. The flanges 10 can be perforated, in particular can have a hole for the guiding through of a start region of the tube, in order to enable a hooking on.

The stand 4 can have a grid 11 at some locations, in order to minimize the risk of injury.

On the guide rails 7 a guiding path 12 is arranged, along which a main body 13 of the tube guiding device 6 can be moved. Facing the core 9, a blade 14 projects away from the main body 13.

Figure 4:
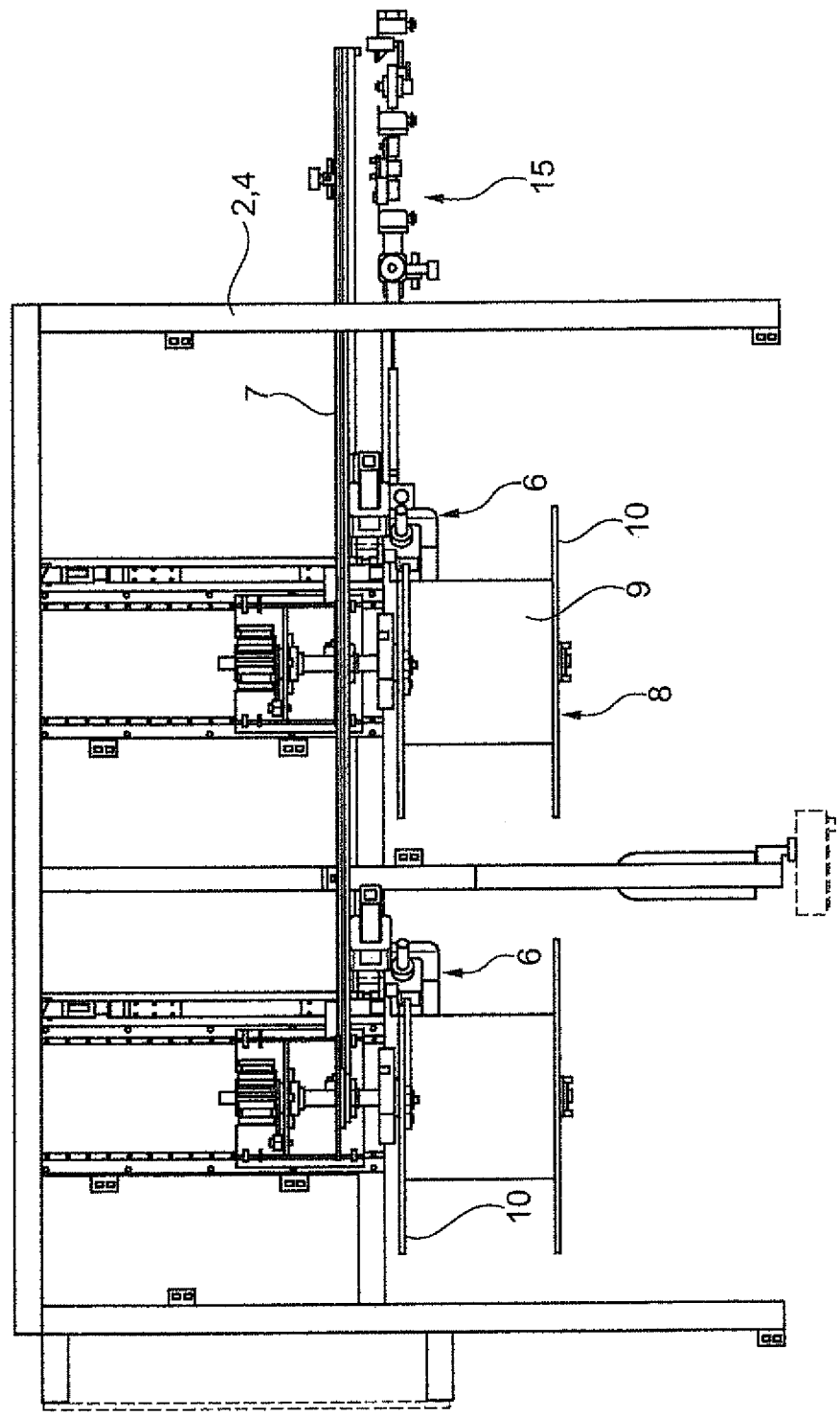
FIG. 4 a view from above onto the double station winder of FIG. 3 with reels maximally displaced transversely forward, FIG. 5 a perspective view of only one reel, onto which the tube is wound, FIG. 6 a detail view of the region VI of FIG. 1, FIG. 7 a detail view of the region VII of FIG. 1, FIG. 8 a detail illustration of the region VIII of FIG. 1, FIG. 9 a view from the front onto motorised traversing units, which act in a transverse-displacing manner on each of the reels of the double station winder, FIG. 10 an enlargement of the region of the motorised traversing units of FIG. 9, FIG. 11 a further view from the front onto a further embodiment of a double station winder, similar to the variant of FIG. 1, FIGS. 12*a* to 12*c* a diagrammatic illustration of the displaceability of the reels of a double station winder according to the invention (FIG. 12*a*) and the status of the reels displaced in two extreme positions, i.e. minimally and maximally transversely moved reels (FIGS. 12*b* and 12*c*), FIG. 13 an enlargement of two tube guiding devices, as are used at a double station winder of the embodiments of FIGS. 1 and 11, FIG. 14 an enlargement of one of the two tube guiding devices of FIG. 13, FIG. 15 a further perspective illustration of the tube guiding device of FIG. 14, FIGS. 16*a* and 16*b* two different embodiments of tube guiding devices with different blades, FIG. 17 a perspective illustration of a tube guiding device with a rotatable blade, FIG. 18 a view from the front onto the tube guiding device of FIG. 17, FIG. 19 a view from above onto the tube guiding device of FIGS. 17 and 18, FIG. 20 a view from the side, from which the tube is fed to the tube guiding device, onto the tube guiding device, FIG. 21 a section along the line XXI through the tube guiding device of FIG. 19, FIG. 22 a diagrammatic illustration of a continuous, offset winding of tube sections for the formation of tube layers, FIG. 23 the structure of the layers with synchronized laying and use of light sensors, capacitive sensors, mechanical sensors and/or inductive sensors, FIG. 24 a view from the front onto a processing system according to the invention, FIG. 25 a view from above onto the processing system of FIG. 24 according to the invention, FIG. 26 a view from the tube feed side onto the processing system of FIG. 24 and FIG. 27 a perspective view of the processing system of FIGS. 24 and 25.
Figure 6:
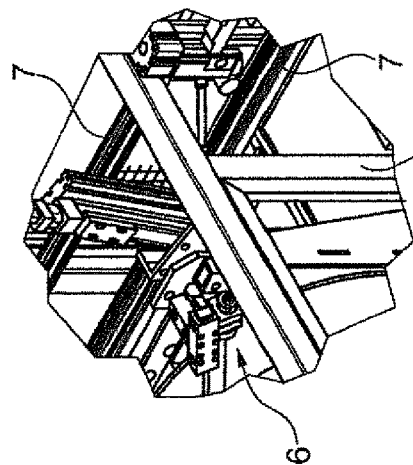
Figure 8:
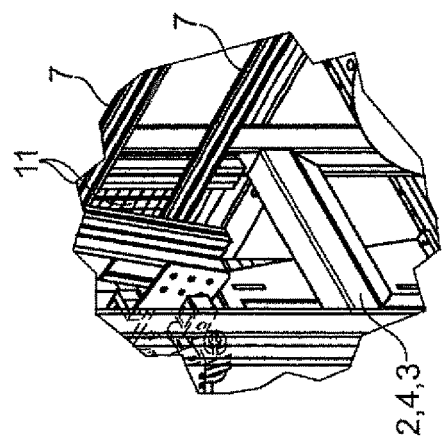
Figure 5:
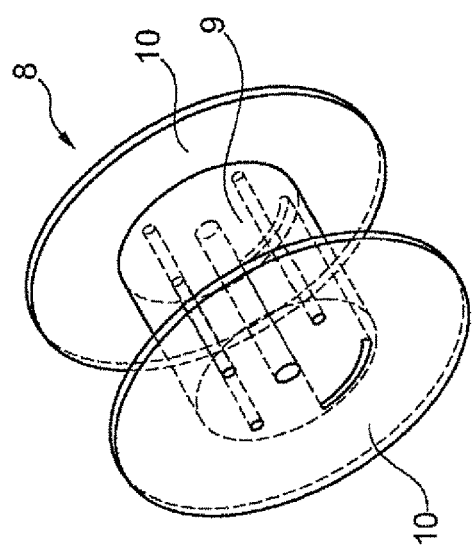
Figure 7:
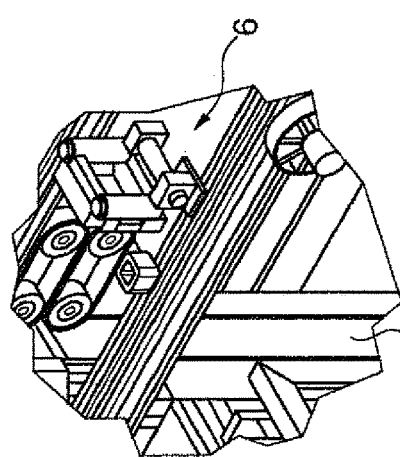

At the inlet of the stand 4, as can be readily seen in FIGS. 2 to 4, an additional conveying device 15 is present. In the operating state, the blade 14 is mounted movably in a transverse plane, i.e. a plane which stands perpendicularly to a rotation axis 16 of the reel 8. The types of connection and the details in the regions VI to VIII of FIG. 1 are illustrated in FIGS. 6 to 8.

Figure 9:
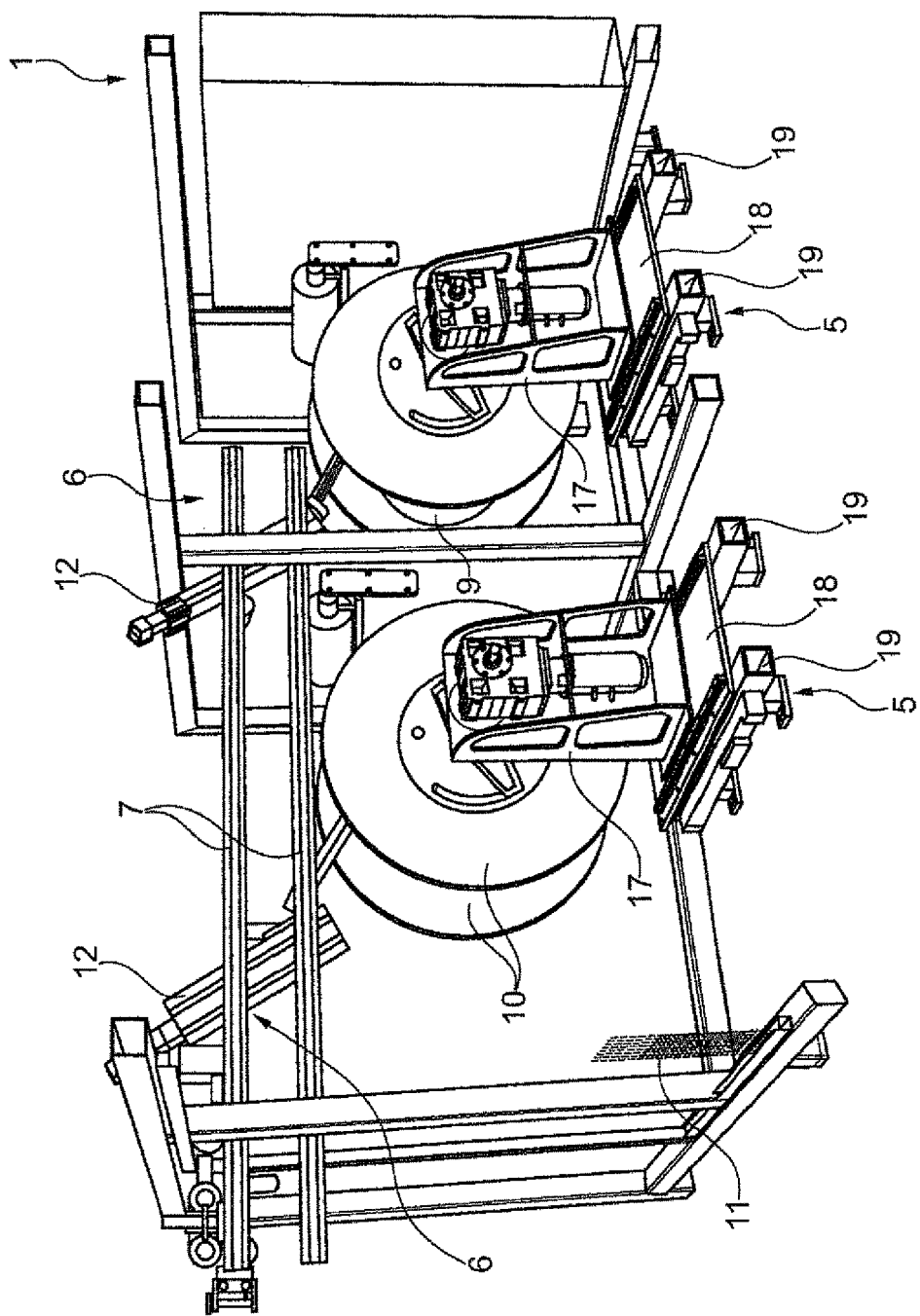
Figure 10:
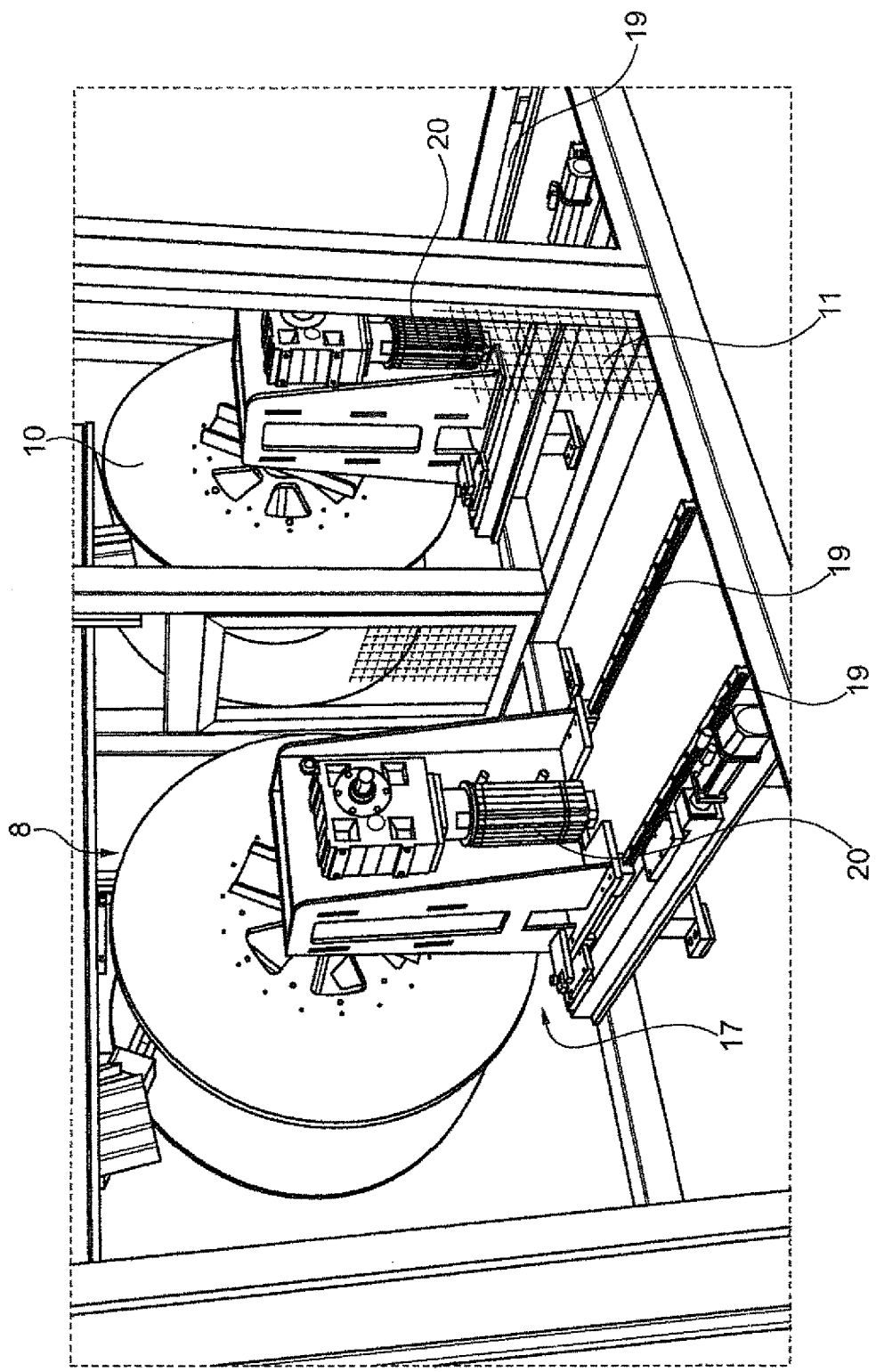

In FIG. 9, a motorised traversing unit 17 is associated with each microduct-tube winder unit 5. The traversing unit 17 is arranged here respectively on a guide plate 18 and is movable along guiding rails 19. These guiding rails 19 are also readily illustrated in FIG. 10, wherein a motor 20, in the manner of an electric motor, is a part of the traversing unit 17.

In the transverse plane of the reel 8, as is illustrated in FIG. 11, an angle α arises to the blade 14 of the tube guiding device 6, which angle in this plane corresponds to the winding angle. The winding angle is formed between a horizontal plane and the blade 14 and runs in the transverse plane. In the operating state, therefore, the tube runs straight between a first transfer point at the distal end of the blade 14 to a second transfer point in the region of the reel 8. This tube section therefore lies in the transverse plane.

The fact that an end piece 21 is caught in a form-fitting manner in a recess 22 can be readily seen from FIG. 11. Otherwise, the empty plastics microduct tube which is to be processed is not illustrated.

In FIG. 12a the transverse displaceability of the reel 8 in the direction of the arrow 23 is illustrated. The arrow 23 indicates the tube feed direction 24. The different movement positions of the reel 8 can be seen from FIGS. 12b and 12c.

Figure 13:
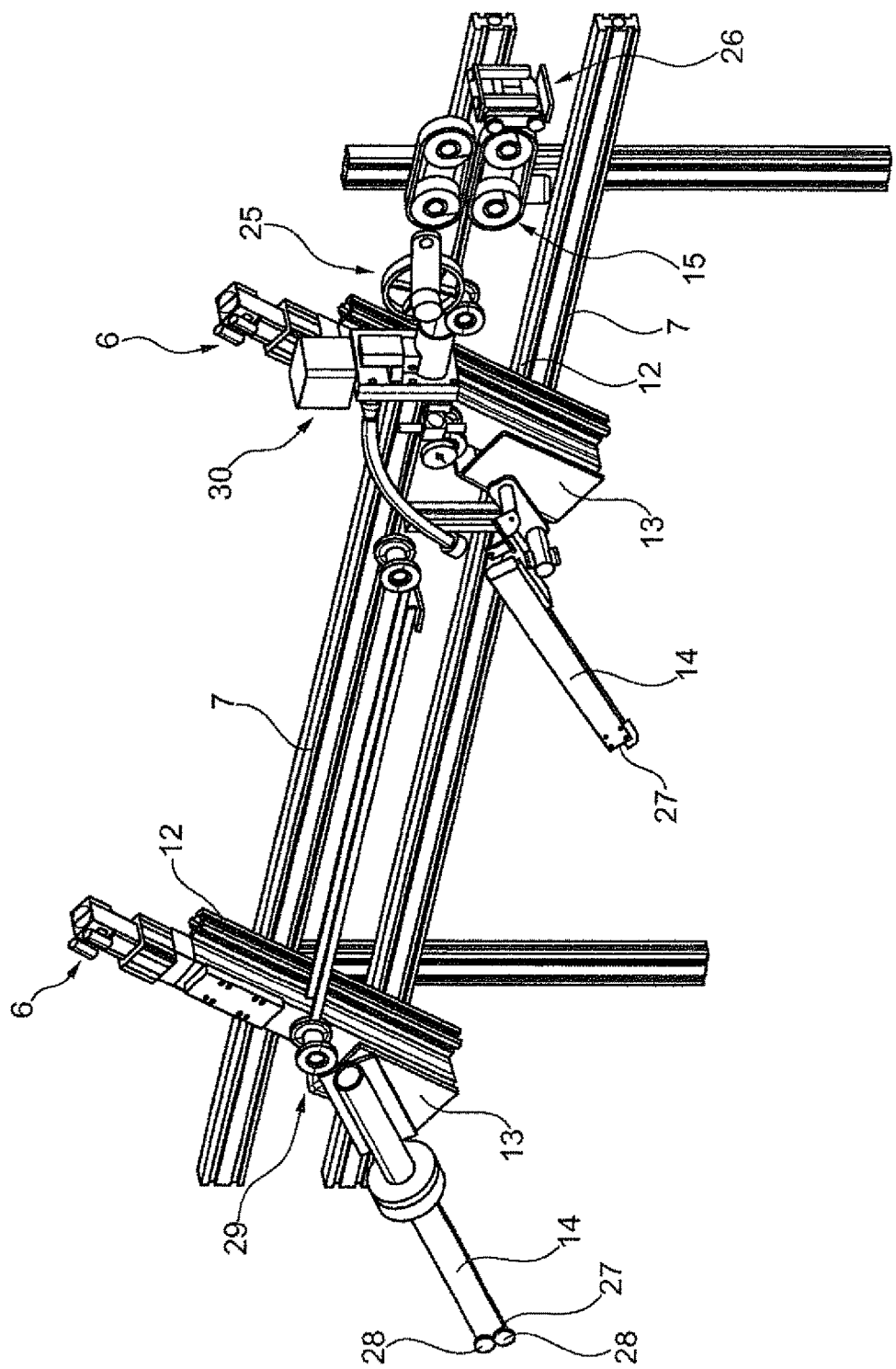

With reference to FIG. 13, it is explained that the tube guiding device 6 has an encoder/coder 25 for detecting the tube length that has already passed. The additional conveying device 15 can also be designated as a "micro haul-off". A centering unit 26 is also upstream of the encoder 25 and the additional conveying device 15, i.e. is arranged on the side of an extruder, not illustrated, of the guiding device 6.

The main body 13 can be embodied as a sleeve, or as an angled support object. At a distal end 27 of the blade 14, two guiding rollers 28 are arranged, between which the empty plastics microduct tube, which is not illustrated, is guided through. An additional guiding roller is arranged in the region of the main body 13 and is given the reference number 29.

The tube guiding device 6 is constructed in the manner of a double axis guide unit. A cutting device 30 is arranged in the manner of a guillotine on the tube guiding device 6.

Figure 14:
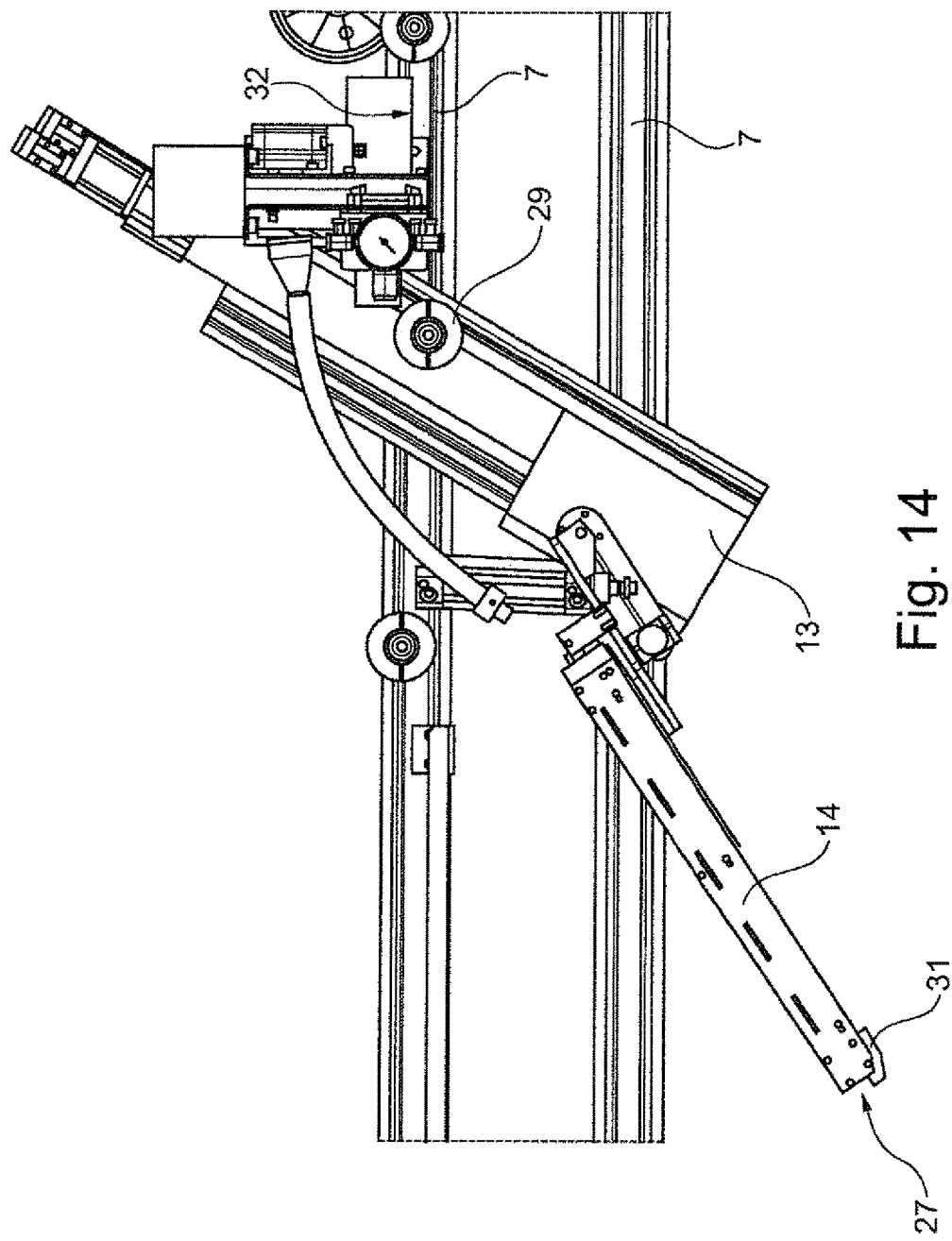
Figure 15:
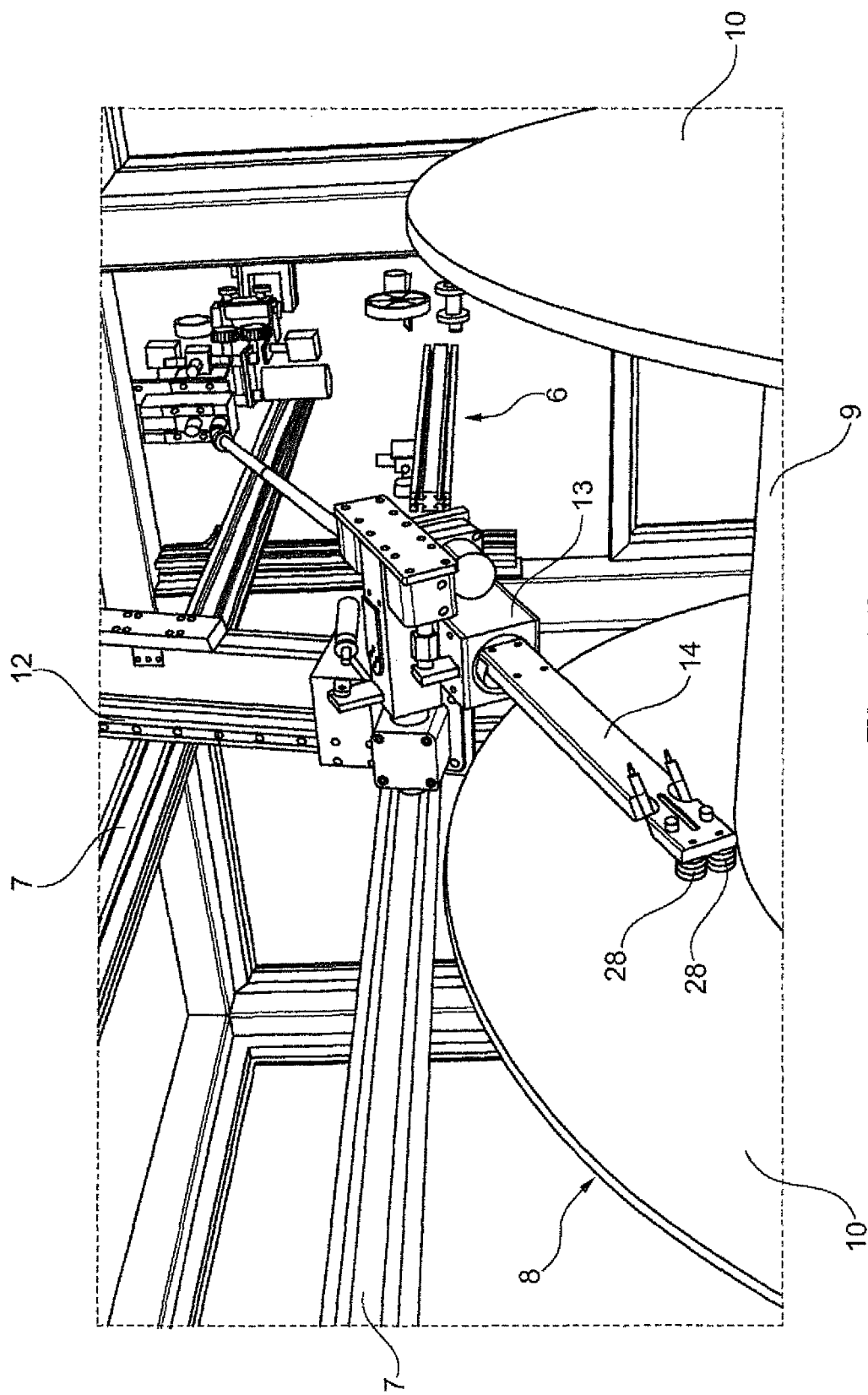

One of the two tube guiding devices 6 illustrated in FIG. 13 is illustrated in an enlarged manner in FIG. 14. However, the two guiding rollers 28 at the distal end can not be seen, instead, a spacer element 31 is present, which is constructed in the manner of a wedge. A material suitable for sliding contact is selected here. A guide section 32 is provided for receiving the empty plastics microduct tube. The blade 14 is connected rotatably/pivotably on the main body 13. Reference is to be made here to FIG. 15.

Figure 17:
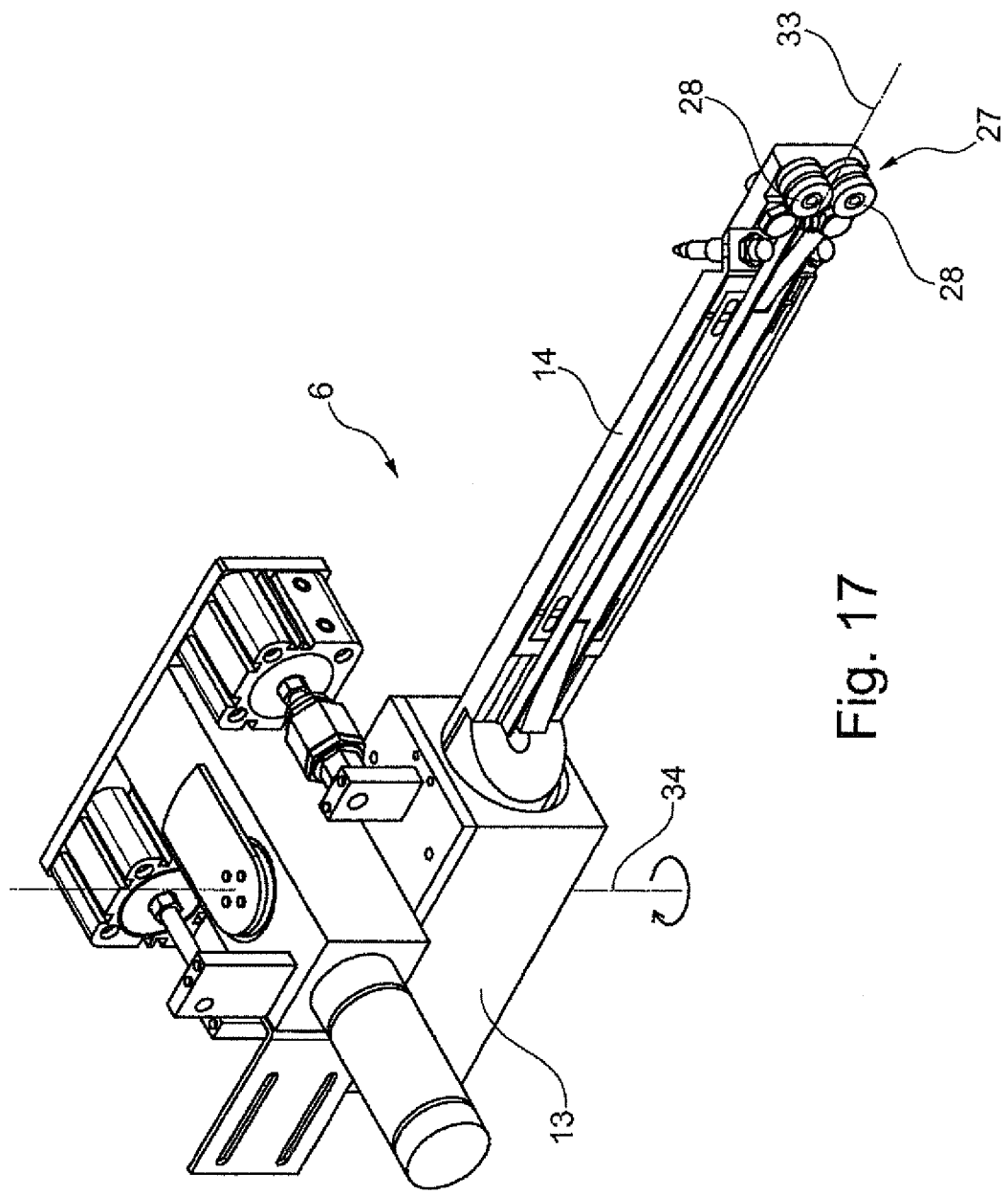
Figure 18:
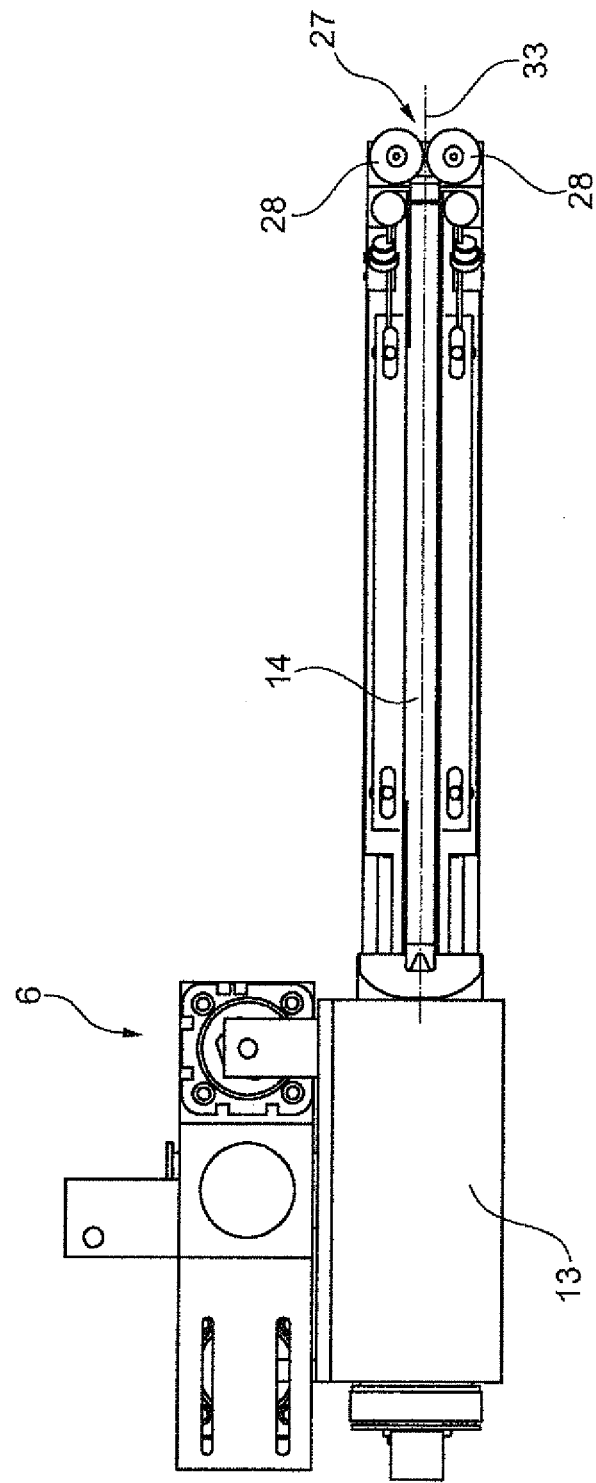
Figure 20:
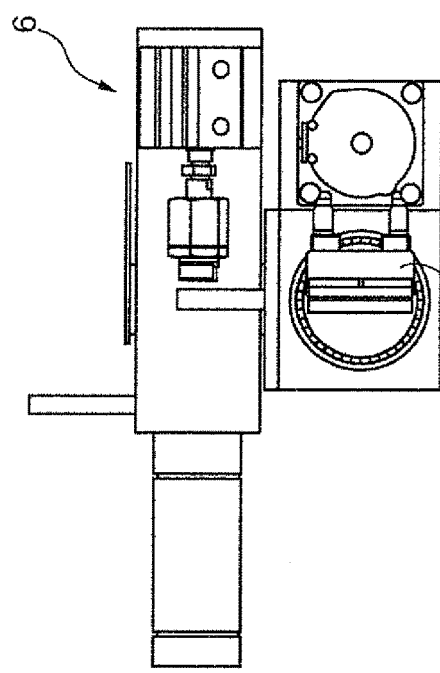

The fact that the blade 14 can be provided with mechanical sensors or ultrasonic sensors for determining distance is self-explanatory in consideration of FIG. 16b. The same can also be seen from FIGS. 17 to 21. Thus, for example, in FIG. 17, the pivotability about the pivot axis 33 of the blade 14 is indicated, just as a pivoting about the rotation axis 34 in the hook-on state is indicated by the arrow 35.

Figure 21:
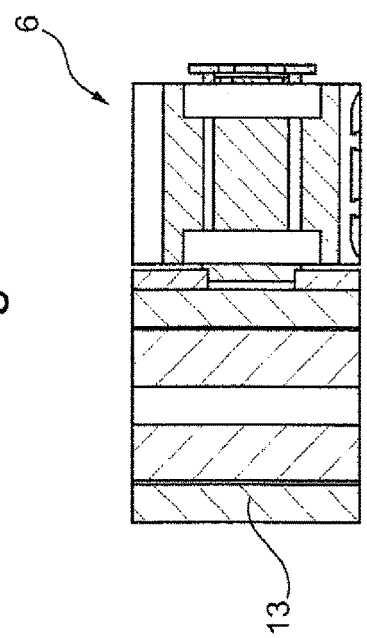
Figure 19:
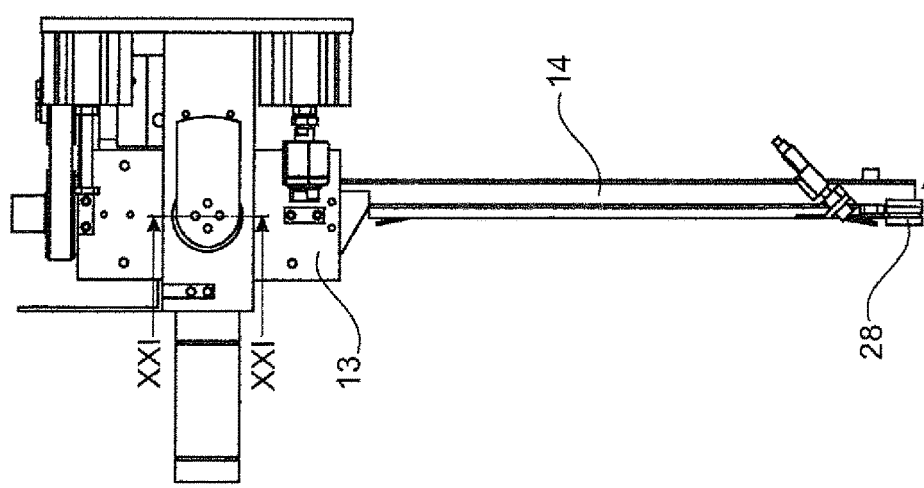

The bearing configuration in the region XXI through the main body 13 is visualized in FIG. 21.

Figure 22:
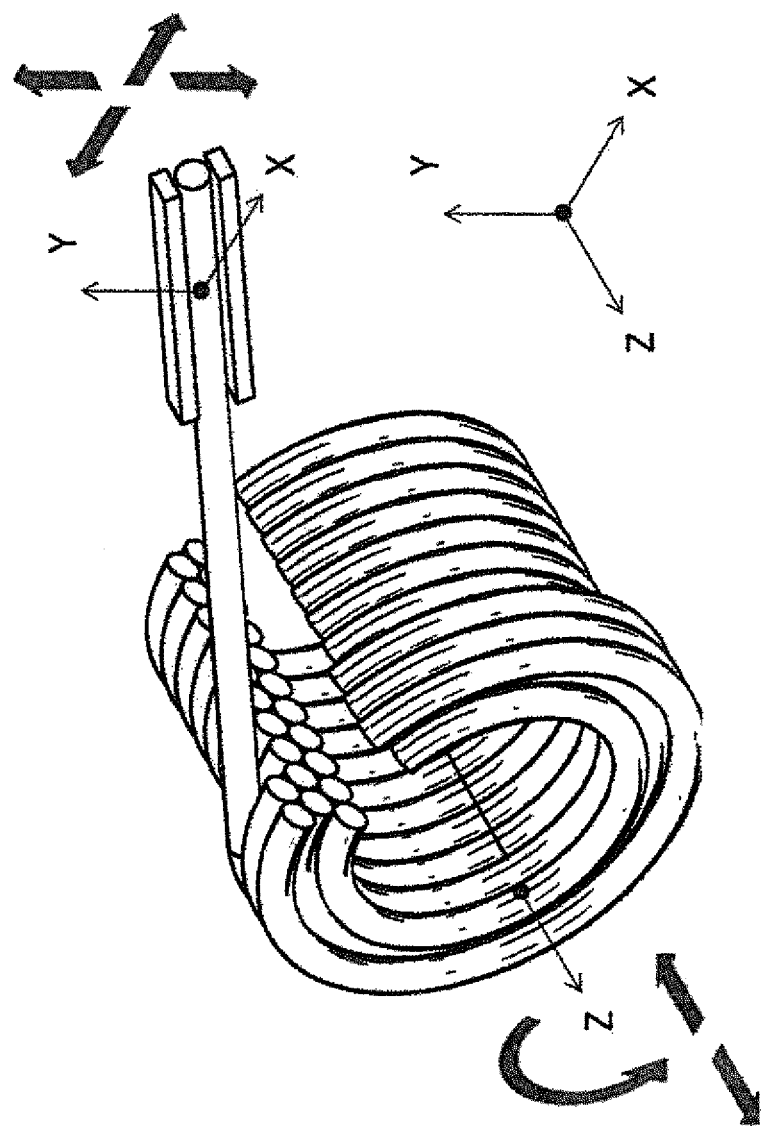
Figure 23:
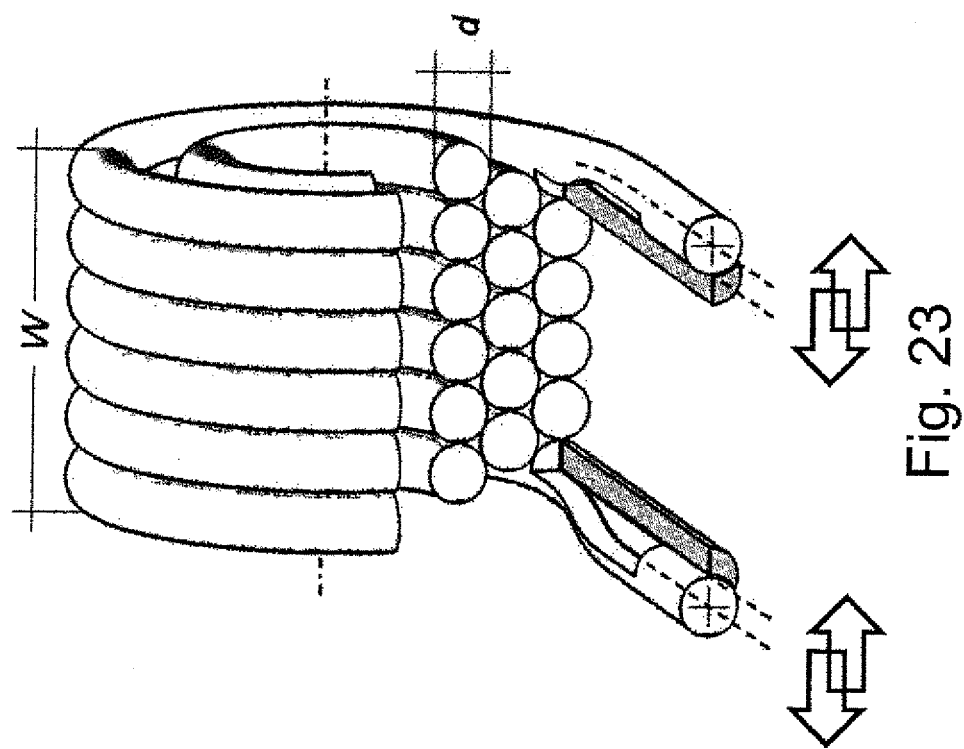
Figure 26:
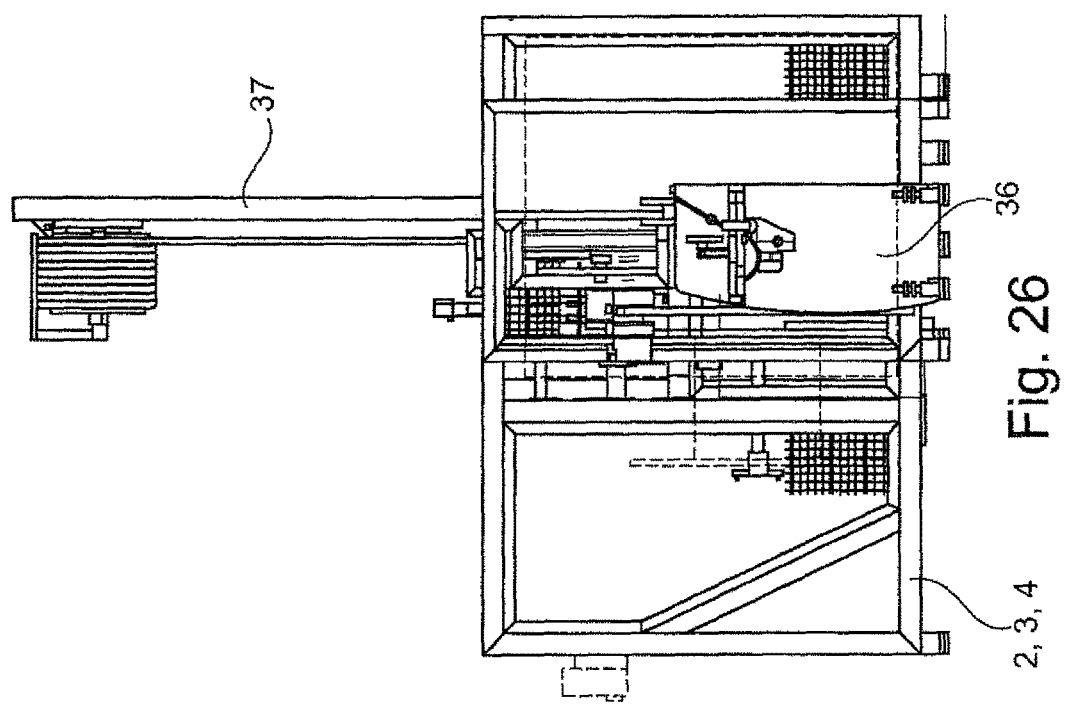
Figure 27:
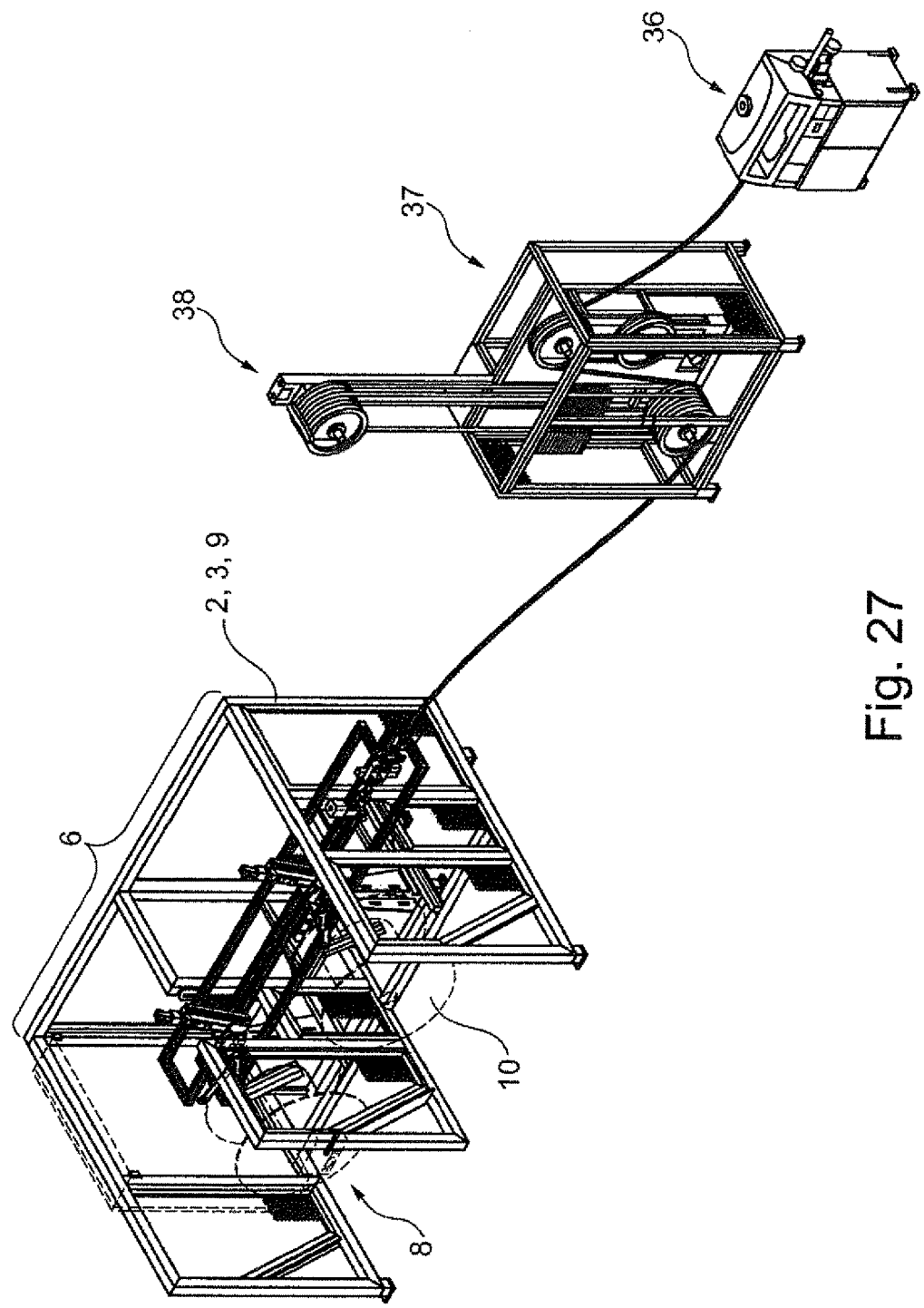

In FIGS. 22 and 23, the winding of the empty plastics microduct tubes in layers is illustrated, wherein in FIG. 22 a continuous offset is brought about and in FIG. 23 a displacement by jerks is enforced. A layer on tubes or respectively tube sections has here the width W, wherein a tube outside diameter is symbolised by d.

The sequence of the arrangement of the individual units in a conveying line can be seen from FIGS. 24 to 27. An extruder is in fact not illustrated, but is arranged further to the right, i.e. remote from the two microduct-tube winders 5. An empty plastics microduct tube created by the extruder then arrives into a belt-type haul-off 36 and is guided past or respectively through a dancer control 37 to a magazine 38, in particular an electric magazine.

A downstream relief haul-off with optional dancer and/or an additional conveying unit 15 guides the empty plastics microduct tube to the double station winder 1 for winding.

Instead of a dancer between the magazine 38 and the double station winder 1, the measurement of the slack is also able to be carried out, for example with the use of an ultrasonic sensor system.

What is claimed is:

1. A tube winder for winding up extruded empty plastics microduct tubes having an outside diameter of about 2 to about 20 mm, said microduct-tube winder comprising:
   a reel mounted for rotation about a rotation axis and including two radially projecting flanges and a core which is arranged between the flanges and on which a tube can be wound; and
   a tube guiding device configured to feed the tube to the reel, said tube guide device having a first transfer point at which the tube loses contact with the tube guiding device, when the microduct-tube winder is in an operating state, and a second transfer point on the reel and at which the tube comes at a winding angle into contact with the core or a tube layer that has been wound previously onto the core at the second transfer point,
   said tube guiding device being movable in a plane perpendicular to the rotation axis of the reel and said reel being movable in a direction of the rotation axis, such that in the operating state the winding angle at the second transfer point remains the same at all times, wherein the winding angle is formed between a horizontal plane and the second transfer point.

2. The tube winder of claim 1, wherein the reel is mounted for simultaneous execution of the rotation about the rotation axis and transverse movement in the direction of the rotation axis.

3. The tube winder of claim 1, wherein the tube guiding device has a winding speed, a tube outside diameter and a movement speed which are coordinated with one another such that in the operating state a distance between the first and the second transfer points remains the same at all times.

4. The tube winder of claim 1, wherein the tube guiding device has a main body and an elongate blade arranged on the main body, with the tube being guided along the blade.

5. A double station winder, comprising two tube winders, each tube winder comprising a reel mounted for rotation about a rotation axis and including two radially projecting flanges and a core which is arranged between the flanges and on which a tube can be wound, and a tube guiding device configured to feed the tube to the reel, said tube guide device having a first transfer point at which the tube loses contact with the tube guiding device, when the tube winder is in an operating state, and a second transfer point on the reel and at which the tube comes at a winding angle into contact with the core or a tube layer that has been wound previously onto the core at the second transfer point, said tube guiding device being movable in a plane perpendicular to the rotation axis of the reel and said reel being movable in a direction of the rotation axis, such that in the operating state the winding angle at the second transfer point remains the same at all times, wherein the winding angle is formed between a horizontal plane and the second transfer point.

6. A processing system for empty plastics tubes produced by an extrusion device, comprising:
   a tube winder comprising a reel mounted for rotation about a rotation axis and including two radially projecting flanges and a core which is arranged between the flanges and on which a tube can be wound, and a tube guiding device configured to feed the tube to the reel, said tube guide device having a first transfer point at which the tube loses contact with the tube guiding device, when the tube winder is in an operating state, and a second transfer point on the reel and at which the tube comes at a winding angle into contact with the core or a tube layer that has been wound previously onto the core at the second transfer point, said tube guiding device being movable in a plane perpendicular to the rotation axis of the reel and said reel being movable in a direction of the rotation axis, such that in the operating state the winding angle at the second transfer point remains the same at all times, wherein the winding angle is formed between a horizontal plane and the second transfer point;
   a magazine arranged upstream of the tube winder feeding the tube to the tube winder; and
   a belt-type haul-off arranged upstream of the magazine to feed the tube from the extrusion device to the magazine.

7. The processing system of claim 6, further comprising a dancer control arranged between the belt-type haul-off and the magazine.

8. The processing system of claim 7, wherein the dancer control is an electric dancer control.

9. A manufacturing system, comprising:
   an extrusion device configured to produce a plastics tube; and
   a processing system comprising:
      a belt-type haul-off receiving the tube from the extrusion device;
      a magazine downstream of the belt-type haul-off and receiving the tube from the belt-type haul-off; and
      a tube winder downstream of the magazine and receiving the tube from the magazine, said magazine tube winder comprising a reel mounted for rotation about a rotation axis and including two radially projecting flanges and a core which is arranged between the flanges and on which a tube can be wound, and a tube guiding device configured to feed the tube to the reel, said tube guide device having a first transfer point at which the tube loses contact with the tube guiding device, when the tube winder is in an operating state, and a second transfer point on the reel and at which the tube comes at a winding angle into contact with the core or a tube layer that has been wound previously onto the core at the second transfer point, said tube guiding device being movable in a plane perpendicular to the rotation axis of the reel and said reel being movable in a direction of the rotation axis, such that in the operating state the winding angle at the second transfer point remains the same at all times, wherein the winding angle is formed between a horizontal plane and the second transfer point.

10. A method for winding an empty plastics tube having an outside diameter of about 2 mm to about 20 mm onto a reel which is rotatable about a rotation axis, using the tube winder of claim 1, said method comprising:
   transferring the tube by a tube guiding device from a first transfer point at which the tube loses contact with the tube guiding device, when the tube winder is in an operating state, to a second transfer point at which the tube comes at a winding angle into contact with the reel; and
   moving the tube guiding device in the operating state only in a transverse plane of the reel while the reel moves continuously or stepwise in a direction of the rotation axis, such that the winding angle remains the same at all times.

* * * * *

UNITED STATES PATENT AND TRADEMARK OFFICE
CERTIFICATE OF CORRECTION

PATENT NO.        : 10,266,363 B2
APPLICATION NO.   : 14/911762
DATED             : April 23, 2019
INVENTOR(S)       : Michael Hofhus et al.

It is certified that error appears in the above-identified patent and that said Letters Patent is hereby corrected as shown below:

On the Title Page

Item (56), page 2, Column 2, Under FOREIGN PATENT DOCUMENTS:
Replace "EP 0 139 088 81": with the correct -- EP 0 139 088 B1 --

Signed and Sealed this
Sixteenth Day of July, 2019

Andrei Iancu
*Director of the United States Patent and Trademark Office*